United States Patent
Padinker et al.

(10) Patent No.: US 12,405,929 B2
(45) Date of Patent: *Sep. 2, 2025

(54) MOVING WINDOW DATA DEDUPLICATION IN DISTRIBUTED STORAGE

(71) Applicant: Google LLC, Mountain View, CA (US)

(72) Inventors: Pavlo Padinker, Redmond, WA (US); Pavan Edara, Redmond, WA (US); Bigang Li, Redmond, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/226,314

(22) Filed: Jul. 26, 2023

(65) Prior Publication Data

US 2023/0376470 A1 Nov. 23, 2023

Related U.S. Application Data

(63) Continuation of application No. 17/876,660, filed on Jul. 29, 2022, now Pat. No. 11,762,821, which is a
(Continued)

(51) Int. Cl.
*G06F 16/215* (2019.01)
*G06F 12/0804* (2016.01)
(Continued)

(52) U.S. Cl.
CPC ........ *G06F 16/215* (2019.01); *G06F 12/0804* (2013.01); *G06F 16/2282* (2019.01); *G06F 16/2322* (2019.01); *G06F 16/235* (2019.01)

(58) Field of Classification Search
None
See application file for complete search history.

(56) References Cited

U.S. PATENT DOCUMENTS

| | | |
|---|---|---|
| 8,140,772 B1 | 3/2012 | Yang |
| 10,387,044 B2 | 8/2019 | Tal et al. |

(Continued)

FOREIGN PATENT DOCUMENTS

| | | |
|---|---|---|
| KR | 20180106127 A | 10/2018 |
| KR | 102007070 B1 | 10/2019 |

OTHER PUBLICATIONS

First Examination Report for Indian Patent Application No. 202247061777 dated Sep. 20, 2023. 10 pages.

(Continued)

*Primary Examiner* — Amresh Singh
(74) *Attorney, Agent, or Firm* — Lerner David LLP

(57) ABSTRACT

The present disclosure describes a service which provides primary in-line deduplication. A streaming application program interface (API) may allow for streaming records into a storage system with high throughput and low latency. As part of this process, the API allows user to add identifiers as a field used for data deduplication. The deduplication service keeps a moving window of the identifiers in memory and does in-line deduplication by quickly determining whether data is a duplicate. Keeping only deduplication keys in memory reduces the cost of running the service. Moreover, the real-time nature of the moving window approach allows for storing deduplication information alongside the data and accessing it immediately on read. In this regard, read after write consistency is supported, and costs are reduced.

17 Claims, 5 Drawing Sheets

Related U.S. Application Data continuation of application No. 17/007,495, filed on Aug. 31, 2020, now Pat. No. 11,442,911.

(51) Int. Cl.
    *G06F 16/22*     (2019.01)
    *G06F 16/23*     (2019.01)

(56)     References Cited

U.S. PATENT DOCUMENTS

| | | | |
|---|---|---|---|
| 11,609,933 B1* | 3/2023 | Ozen | G06F 16/2477 |
| 2016/0188622 A1 | 6/2016 | Sharangpani | |
| 2017/0123676 A1 | 5/2017 | Singhai et al. | |
| 2017/0155694 A1* | 6/2017 | Pinkovezky | H04L 67/535 |
| 2017/0228247 A1 | 8/2017 | Aron et al. | |
| 2017/0315875 A1* | 11/2017 | Tirupati Nagaraj | G06F 11/1451 |
| 2018/0268880 A1 | 9/2018 | Lee | |
| 2019/0130004 A1 | 5/2019 | Singh et al. | |
| 2019/0212935 A1* | 7/2019 | Egbert | G06F 3/0641 |
| 2019/0227941 A1 | 7/2019 | Chang et al. | |
| 2020/0089781 A1 | 3/2020 | Jayaraman et al. | |

OTHER PUBLICATIONS

International Search Report and Written Opinion for International Application No. PCT/US2021/046273 dated Nov. 9, 2021. 17 pages.

Office Action for Korean Patent Application No. 10-2022-7038321 dated Apr. 22, 2024. 5 pages.

Notice of Allowance for Korean Patent Application No. 10-2022-7038321 dated Sep. 3, 2024. 2 pages.

\* cited by examiner

MOVING WINDOW DATA DEDUPLICATION IN DISTRIBUTED STORAGE

CROSS-REFERENCE TO RELATED APPLICATIONS

The present application is a continuation of U.S. patent application Ser. No. 17/876,660, filed Jul. 29, 2022, which is a continuation of U.S. patent application Ser. No. 17/007,495, filed Aug. 31, 2020, now U.S. Pat. No. 11,442,911, the disclosures of which are incorporated herein by reference.

BACKGROUND

In high throughput streaming systems, it is sometimes difficult or impossible to know the result of a write operation without reading the data. For example, faults in communication, races between distributed system servers and dependent services, server crashes, etc. may make it difficult to determine which data was written first or to determine if it was written successfully without performing a read. Just as one example, a server pulls a message from an asynchronous messaging service, but crashes before it can acknowledge the message in the service. As such, the write is considered unsuccessful. When the next server pulls the same message, it creates a duplicate in storage. As another example if a server sending data to storage receives a message that the request timed out, the server will retry. If data sent in the failed request had already reached the storage backend, the retry will cause a duplicate to be created.

It is possible to perform deduplication using existing key-value storage systems, but they are not designed for deduplication. Key-value storage, to be used for deduplication, has to be used as a temporary buffer for the data. Moreover, the deduplication only happens on read, meaning that storage for data for all duplicates is needed in the buffer. Further, all the data must be kept together with deduplication keys in the key-value storage for X minutes, resulting in high cost. Deduplication has to happen on each read from the key-value store. Additionally, the data should be extracted from the buffer into a permanent location periodically, which requires complicated service, dedicated to reading the buffer data, keeping track of which data is extracted, clearing the buffer, etc. The fact that data is added and extracted asynchronously by two separate processes leads to races, when a reader can receive data from a temporary buffer, permanent storage, both, or neither is based on an outcome of the race.

BRIEF SUMMARY

The present disclosure describes a service which provides primary in-line deduplication. A streaming application program interface (API) may allow for streaming records into a storage system with high throughput and low latency. As part of this process, the API allows user to add identifiers as a field used for data deduplication. In previous systems, data is written into a temporary buffer backed by a data storage system, where deduplication happens in the background, which can have high cost and other limitations that make it impossible to support transaction write, read after write consistency, etc. In contrast, in the implementation described herein, data can be written directly into a file system. The deduplication service keeps a moving window of the identifiers in memory and does in-line deduplication by quickly determining whether data is a duplicate. Keeping only deduplication keys in memory reduces the cost of running the service. Moreover, the real-time nature of the moving window approach allows for storing deduplication information alongside the data and accessing it immediately on read. In this regard, read after write consistency is supported, and costs are reduced.

One aspect of the disclosure provides a method for deduplication, including receiving, with one or more processors, a request to write data to a table, the request including an insert identifier, processing, with the one or more processors, the insert identifier for the request when the request was received within a predetermined time window, determining, with the one or more processors, whether table data corresponding to the insert identifier is duplicate, storing, with the one or more processors, the insert identifier in memory when the data is not duplicate, and updating the memory to remove insert identifiers added outside of the predetermined time window. According to some examples, the predetermined time window may be relative to a current time. For example, each insert identifier may have an associated timestamp, and updating the memory to remove insert identifiers may include removing insert identifiers having timestamps that no longer fall within the predetermined window. Duplicate data may be flagged, such as by marking the duplicate data in the table or storing an indication of the duplicate data in a component used to read the data from the table. In some examples, duplicates are identified prior to writing the data to the table, and the duplicate data is not written. Determining whether table data corresponding to the insert identifier is duplicate may include determining whether the received insert identifier is already stored in memory.

Another aspect of the disclosure provides a system for deduplication, including a memory storing one or more insert identifiers, each insert identifier being attached to data written to a table within a predetermined time window, and one or more processors in communication with the memory and the table. The one or more processors may be configured to receive a request to write data to a table, the request including an insert identifier, process the received insert identifier for the request when the request was received within the predetermined time window, determine whether table data corresponding to the received insert identifier is duplicate, store the received insert identifier in memory when the data is not duplicate, and update the memory to remove insert identifiers added outside of the predetermined time window.

Yet another aspect of the disclosure provides a non-transitory computer-readable medium storing instructions executable by one or more processors for performing a method of deduplication. Such method includes receiving a request to write data to a table, the request including an insert identifier, processing the received insert identifier for the request when the request was received within the predetermined time window, determining whether table data corresponding to the received insert identifier is duplicate, storing the received insert identifier in memory when the data is not duplicate, and updating the memory to remove insert identifiers added outside of the predetermined time window.

DETAILED DESCRIPTION

Figure 1:
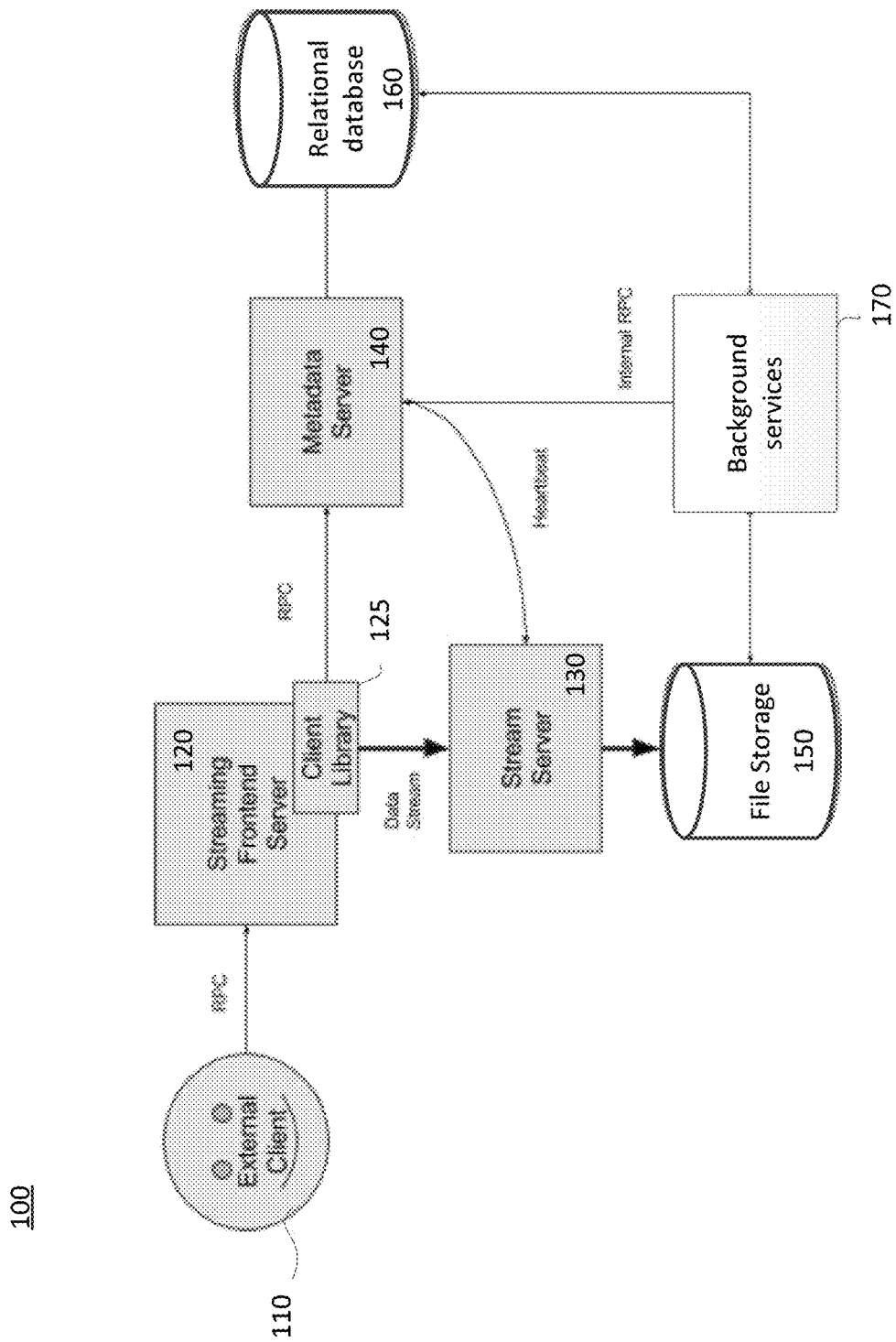
FIG. 1 is a block diagram of an example system

FIG. 1 illustrates an example system 100 supporting the storage of data in a relational database 160. The system 100 includes metadata server 140, stream server 130, client library 125, and background services 170. The client library may run either in a user process or on a frontend streaming server 120. The background services 170 may include services such as replication, conversion, garbage collection, etc.

The relational database 160 may be a distributed computing environment. For example, a plurality of datacenters may be communicatively coupled over a network. The datacenters may be positioned a considerable distance from one another. For example, the datacenters may be positioned in various countries around the world. Each datacenter may include one or more computing devices, such as processors, servers, shards, cells, or the like. Programs may be executed across these computing devices, for example, such that some operations are executed by one or more computing devices of a first datacenter while other operations are performed by one or more computing devices of a second datacenter. In some examples, the computing devices in the various datacenters may have different capacities. For example, the different computing devices may have different processing speeds, workloads, etc. Each datacenter may also include a number of storage devices, such as hard drives, random access memory, disks, disk arrays, tape drives, or any other types of storage devices. The datacenters may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like.

The stream server 130 is a storage service, which receives user data, such as from external client 110. The user data may be received over high throughput channels, such as bidirectional streams. The stream server 130 persists the received user data into file storage 150.

Metadata server 140 is a metadata service, which handles operations over streams and streamlets. Such operations include selection and assignment of healthy stream servers to streamlets, requesting routing, etc. Metadata may be stored in relational database 160.

Requests are received at the streaming frontend 120 from the external client 110. The streaming frontend 120 may include, for example, an API for writing data to the file storage 150. The requests may be received as remote procedure calls (RPCs) over a network. For example, using an Internet socket, the client 110 can connect to a service operating on remote servers through an Internet protocol suite. Servers can set up listening sockets that may accept an initiating connection for sending and receiving information. The network, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.72, 702.72b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

The request from the external client 110 may include an insert identifier. A deduplication service, such as an API, keeps track of the insert identifiers for each row in the table within a predetermined window of time, such as one minute. Using this information, the deduplication service determines whether the data in each row of the table is duplicate. For example, at each point in time, the deduplication service is processing some insert identifiers for the table and can determine whether or not these identifiers were used for other inserts into the same table within a one minute time window. If the current occurrence of the insert identifier is not the first one in the one minute time window, the service may determine that it is duplicate.

The deduplication service provides other components within the system 100 with information whether or not each row is a duplicate of an already existing row within the time window. In some examples, information about duplicates may be stored along with data. In other examples, if there is determined to be a duplicate, the whole row may be dropped.

In a deduplication workflow for basic writes, the deduplication service tasks periodically update task load information in the relational database 160. The client library 125 calls the metadata server 140 to create a streamlet. As part of streamlet creation, deduplication tasks to use are returned in response. The metadata server 140 receives the streamlet creation request and either returns cached N deduplication tasks or based on a deduplication task load in the relational database 160 picks N tasks to serve this table. The client library 125 stores insert identifiers along with data in a batch and sends the batch to the stream server 130. The stream server 130 parses the data and asynchronously calls the deduplication service for a batch of insert identifiers, asynchronously writing the received deduplication information into the file storage 150, such as in log file footers.

In a deduplication workflow for basic reads, the stream server 130 reads from the client library 125 and reads deduplication information. Based on this deduplication information, the stream server 130 skips over records that are marked as duplicates. In situations when the file is read directly by the client library 125, the client library 125 skips over duplicate records when reading the file.

In a deduplication workflow for writes when the deduplication task is overloaded, the deduplication service task updates its task load in the relational database 160, showing the overload. Accordingly, no new tables will be assigned to the overloaded task. The deduplication service calls the metadata server 140 and receives an indication of which table it should move to which deduplication task replica. The deduplication task may then enter a State Transfer state, in which it replicates all requests for the specific table into the replica. The replica, on request for this table, reads it from the owner, as stored in the relational database 160. In some examples, a background copy may be started to copy the state. The state may be kept for the duration of the predetermined window of time for which insert identifiers are stored in memory. As such, if the master-replica pair is left for that predetermined window of time, the replica would have all the new data and the master would have none. The master deduplication task may begin rejecting requests for the table, and redirecting to the replica. The master deduplication task calls the metadata server 140 to update ownership and finalize the state transfer.

Figure 2:
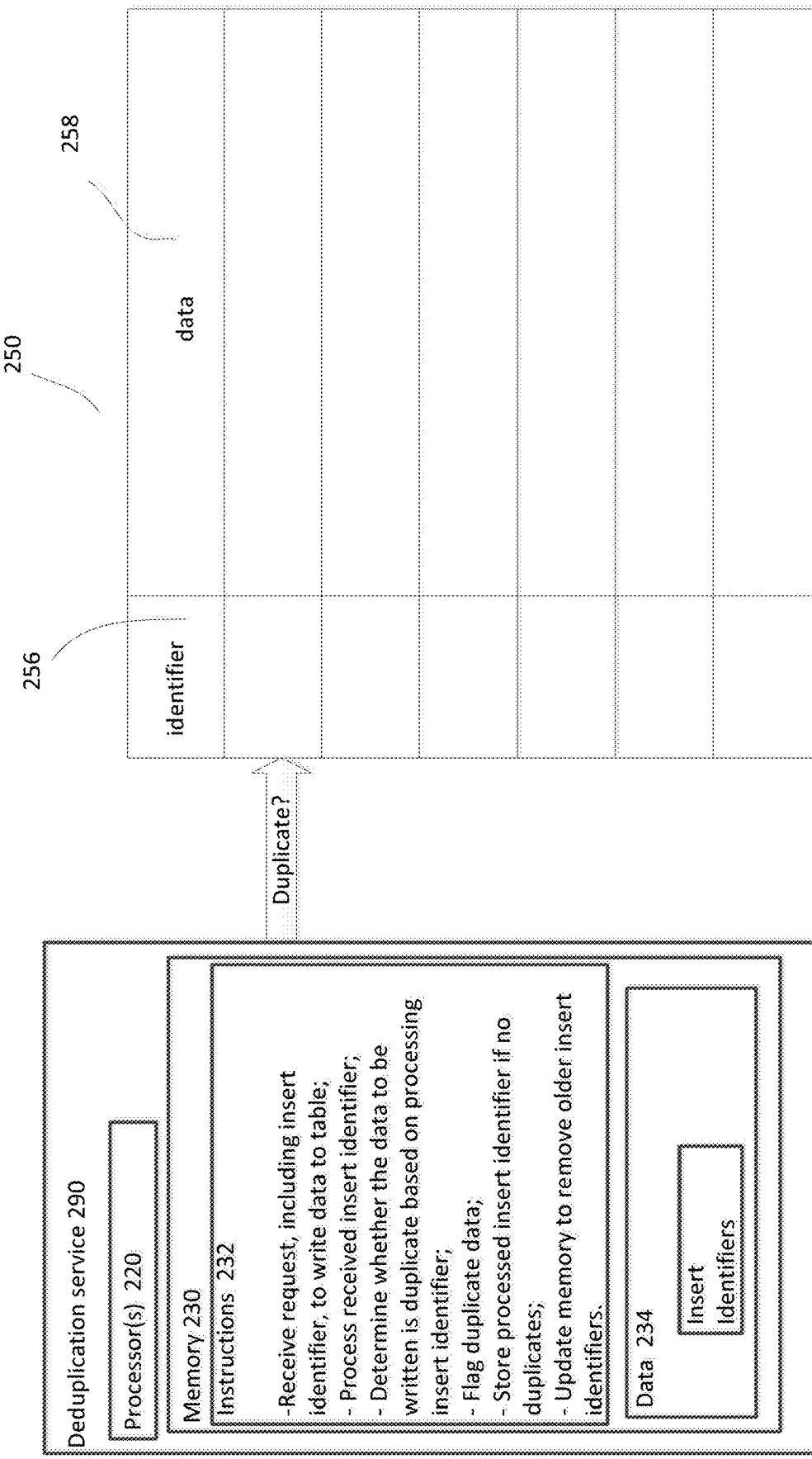
FIG. 2 is an illustration of an example system performing moving window deduplication according to aspects of the disclosure.

FIG. 2 illustrates an example of deduplication service 290 determining whether rows of data 258 in a table 250 are duplicate, using insert identifiers 256 that are added to the table upon entry of the data 258. Each insert identifier 256 added to the table 250 may uniquely identify the corresponding row of data 258, like a key. As described below, as the insert identifiers 256 are added to the table 250, they are also stored in a memory and used to perform deduplication for selected portions of the table 250.

The deduplication service 290 may be executed on one or more machines, such as a centralized controller or a computing device within a datacenter. In either case, the one or more machines may contain a processor 220, memory 230, and other components.

The memory 230 can store information accessible by the processor 220, including instructions 232 that can be executed by the processor 220. Memory can also include data 234 that can be retrieved, manipulated or stored by the processor 220. The memory 230 may be a type of non-transitory computer readable medium capable of storing information accessible by the processor 220, such as a hard-drive, solid state drive, tape drive, optical storage, memory card, ROM, RAM, DVD, CD-ROM, write-capable, and read-only memories. The processor 220 can be a well-known processor or other lesser-known types of processors. Alternatively, the processor 220 can be a dedicated controller such as an ASIC.

The instructions 232 can be a set of instructions executed directly, such as machine code, or indirectly, such as scripts, by the processor 220. In this regard, the terms "instructions," "steps" and "programs" can be used interchangeably herein. The instructions 232 can be stored in object code format for direct processing by the processor 220, or other types of computer language including scripts or collections of independent source code modules that are interpreted on demand or compiled in advance.

The data 234 can be retrieved, stored or modified by the processor 220 in accordance with the instructions 232. For instance, although the system and method is not limited by a particular data structure, the data 234 can be stored in computer registers, in a relational database as a table having a plurality of different fields and records, or XML documents. The data 234 can also be formatted in a computer-readable format such as, but not limited to, binary values, ASCII or Unicode. Moreover, the data 234 can include information sufficient to identify relevant information, such as numbers, descriptive text, proprietary codes, pointers, references to data stored in other memories, including other network locations, or information that is used by a function to calculate relevant data.

Although FIG. 2 functionally illustrates the processor 220 and memory 230 as being within the same block, the processor 220 and memory 230 may actually include multiple processors and memories that may or may not be stored within the same physical housing. For example, some of the instructions 232 and data 234 can be stored on a removable CD-ROM and others within a read-only computer chip. Some or all of the instructions and data can be stored in a location physically remote from, yet still accessible by, the processor 220. Similarly, the processor 220 can actually include a collection of processors, which may or may not operate in parallel.

The data 234 may include the stored insert identifiers. The insert identifiers may be stored in, for example, a simple data structure in memory. The total size of memory taken per table and per task may be limited, and relatively strict age based eviction may be implemented to make sure the window is not larger than the predetermined time window. In that regard, the data 234 may continually be updated as rows of the table 250 are reviewed and new insert identifiers 256 are added to the table 250. For example, insert identifiers 256 added to the table 250 within a predetermined window of time, such as several seconds, one minute, several minutes, etc., may be stored in the data 234. As new rows of data 258 are added to the table 250 and new insert identifiers 256 are added to the data 234 in memory 230, older insert identifier outside of the predetermined window of time may be deleted.

The instructions 232 may be executed to cause the service to store the insert identifiers attached to the data table 250 within a predetermined time period, determine whether the data is each row associated with one of the stored insert identifiers is duplicative, and flag or remove duplicate data from the table. For example, when duplicates are detected, duplicates information could be either stored alongside the data, such as on the stream server 130 (FIG. 1), and ignored on read. Storing information about duplicates alongside the data allows for recovery of the data. For example, if there is a bug in deduplication logic that causes records to be falsely identified as duplicates, recovery would be possible prior to garbage collection.

According to other examples, when duplicates are detected they may be immediately removed from the table 250. An acknowledgement may be sent to confirm successfully removal of the duplicate data Immediately removing records allows for simplification of lower levels of storing data on disk. The disks would not need to be changed to be able to take in information about duplicates, wait for the response from deduplication service, behavior change for read, etc.

While one table 250 is illustrated in FIG. 2, it should be understood that the deduplication service may review any number of tables at any given time.

The deduplication service may be integrated into various components of the system 100 of FIG. 1. By way of example, the deduplication service may be integrated into the stream server 130 or the frontend server 120. In either implementation, latencies may be minimized and a change of the streaming input pipeline being blocked may be minimized to avoid accumulation of a large number of requests on streaming frontends.

Figure 3:
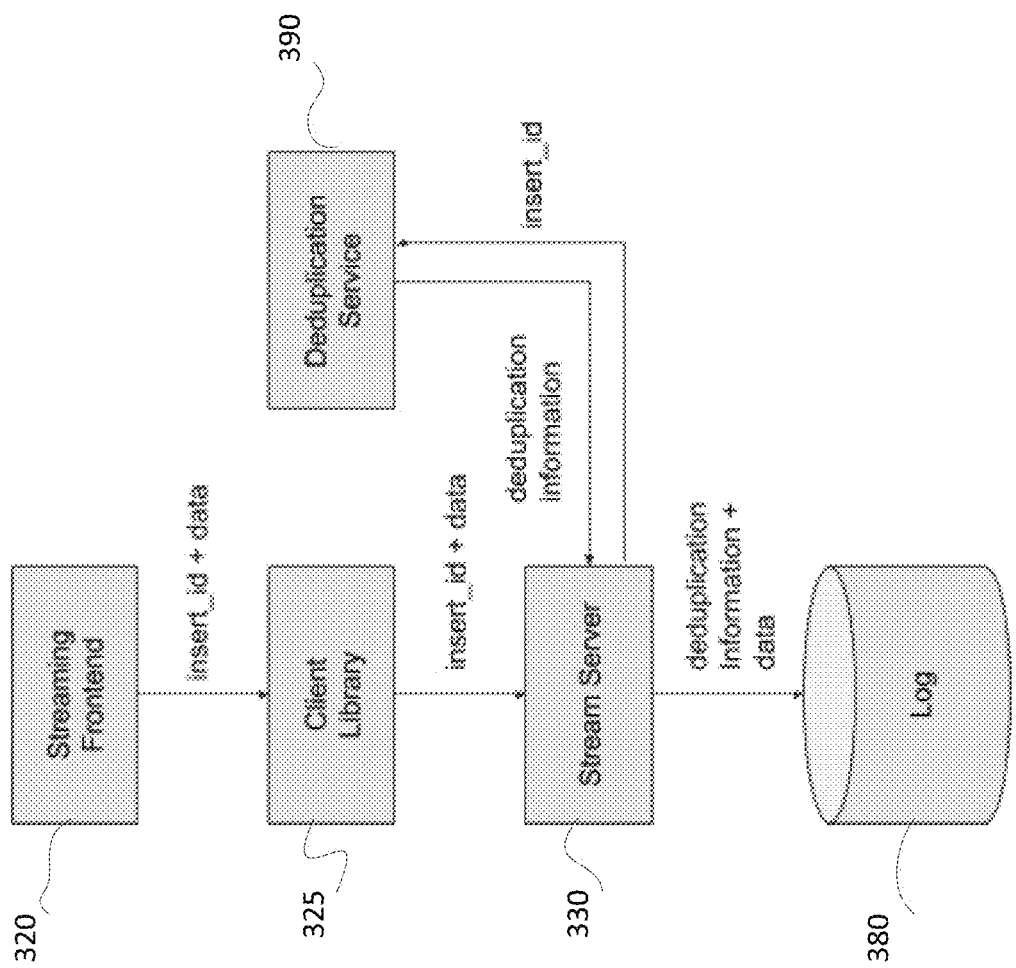
FIG. 3 is a block diagram of an example implementation integrating a deduplication service into a stream server according to aspects of the disclosure.

FIG. 3 illustrates an example of stream server based integration. In this example, stream server 330 talks to deduplication service 390 for every row it stores. For example, the stream server 330 talks to the deduplication service after the data is persisted to the disk. Deduplication information is added after the data in the metadata block in the same file. In this regard, with two simultaneous writes, no matter the call order, if one of them fails, the successful one will not be marked as duplicate. For example, as requests to add data are received from an external client (not shown) at streaming frontend 320, the data and an insert identifier for the data are sent to client library 325 and stream server 330. The stream server 330 provides the insert identifier to the deduplication service 390, which provides deduplication information back to the stream server 330. This exchange of information may be performed using a bidirectional stream, such as with RPCs or bidi streaming. The stream server 330 may add the deduplication information and the data to a log 380.

The bidirectional stream between the stream server 330 and the deduplication service 390 allows an order in which requests are received to be maintained. It also allows for sending and processing of the requests asynchronously, while keeping the order. Keeping a constant bidirectional stream between the stream server 330 and the deduplication service 390 would ensure minimal latencies and high throughput. Batching may be performed to further ensure minimal latencies and high throughput. Each deduplication task may support numerous concurrent bidirectional streams. In this regard, multiple stream servers within a cell may connect to the same deduplication task.

The stream server 330 writes deduplication data asynchronously so as not to block writes. On reads, the stream server 330 may block reads with a timestamp until all the deduplication information is received and persisted up to the requested timestamp. For example, if the file is being actively written to by the stream server 330, the reader may wait for the deduplication information for enough time to ensure that no new deduplication information will be added and considered by the readers.

Figure 4:
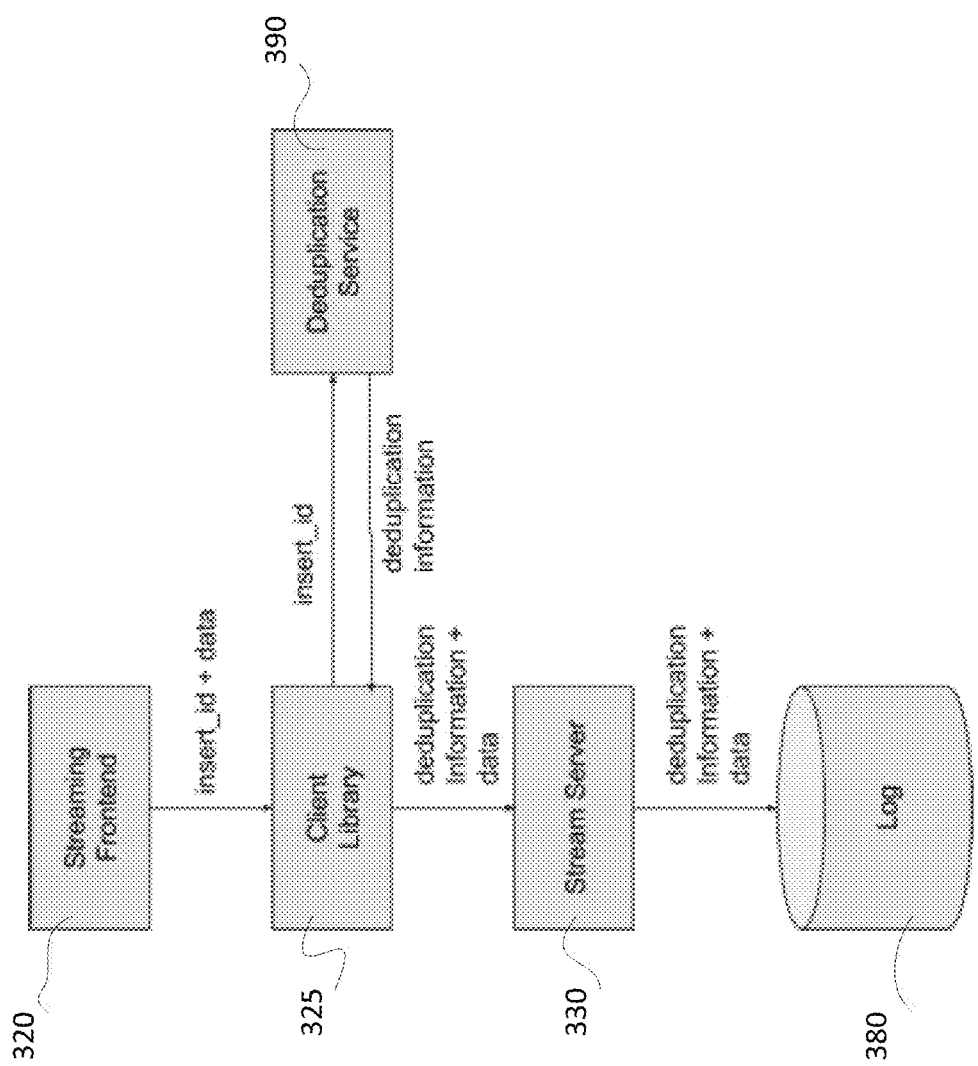
FIG. 4 is a block diagram of an example implementation integrating a deduplication service into a client library of according to aspects of the disclosure.

FIG. 4 illustrates an example of frontend based integration through the client library 325. For example, the deduplication service 390 talks to the streaming frontend 320 through the client library 325, and passes deduplication information to the stream server 330 through the client library 325. The stream server 330 may receive the duplication information from the client library 325 in the data itself, and persists on disk.

Frontend based integration may result in a larger number of connections for each deduplication task, as compared with stream server integration. For cells including several hundred streaming frontends 320, each deduplication task may have to support thousands of streaming connections.

To avoid blocking and waiting for the deduplication service 390 on each request, the deduplication information may be batched for a predetermined number of requests and sent at once. Where the client is already batching requests to the stream server 330, batching deduplication information further decreases latency by an amount corresponding to the predetermined number of requests in the batch.

According to some examples, deduplication information may be sent separately from the data. Moreover, the deduplication information may be delayed as compared to the data. In this case the stream server 330 should be capable of storing the deduplication information separately from the data. To avoid potential issues that may arise if two frontends call with the same insert identifiers, the deduplication service may be called only after data is persisted on disk and then deduplication data is sent to the stream server 330, such as with the next request or as a separate blob.

For either integration implementation, the stream server 330 persists information about duplicates together with data in the log file. The deduplication information may be formatted in a way that takes into account the fact that a normal case means no duplicates in the system. For example, the deduplication information may be transferred and stored as a repeated integer for index of duplicate rows in a batch. In terms of memory overhead, it may add something between zero and a few bytes per X records.

The stream server 330 calls the deduplication service 390 after data is persisted and persists duplicates information asynchronously in the same log file. For each streamlet, the stream server 330 may keep a watermark, such as a latest sequence number and or time for persisted deduplication information. Reads attempting to read data past the watermark will be blocked until a write thread moves the watermark forward. The write thread moves watermark even if the deduplication service 390 is down, after request timeout. Further, blocked reads could trigger faster watermarks to move.

According to some examples, measure may be taken for heat management. Tables have different throughput and that throughput changes over time. In some cases streaming may stop completely. Each deduplication task can support a finite number of rows per second, so if a table grows too big or if too many small tables share the same deduplication task, it could become overloaded. Referring back to FIG. 1, the metadata server 140 may keep track of assigned deduplication tasks per table in the relational database 160. It also caches this information. To support heat management, a deduplication task may estimate its load, which it periodically stores in the relational database 160, per table. This load may be used by the metadata server 140 to assign deduplication tasks to a table.

To support failure detection, a deduplication task heartbeats into a relational database table. The metadata server 140 uses this information to determine if the task is dead and assign another task instead.

A deduplication task has a hard limit of how much load it supports, and once this limit is reached it does not accept new tables tracking and is able to push some tables data out of memory. It may further be able to force the metadata server 140 to pick another, less loaded deduplication task. The new deduplication task is able to receive the data from the previous task to ensure continuous deduplication. The metadata server 140 persists deduplication task assignments into the relational database 160, so no state transfer is needed for this state.

If a deduplication task restarts, the deduplication state should not be lost. State and tables ownership of the task should be transferred to another task before restart. To achieve proper state transfer, for the duration of the state transfer, a component of the system 100 of FIG. 1 writes to one task and reads from both. This is achieved by assigning a replica deduplication task to the master. The master passes all the reads and writes to the replica and reads locally as well.

In the event the deduplication state is lost, an inability to connect to the deduplication task makes the client re-create the streamlet. On streamlet creation, the metadata server 140 detects missing heartbeats from the deduplication task and assigns another deduplication task.

To support large tables, the stream server 130 or frontend server 120 may be able to shard them and use multiple deduplication job tasks to compute duplicates. For example, each table may be assigned N deduplication tasks. For each insert identifier, the stream server 130 or frontend server 120 sends it to N deduplication tasks. All tasks return deduplication information, which should be reconciled on the stream server 130 or frontend server 120. Because table throughput is unknown at first, the metadata server 140 may start by assigning one deduplication task per table. Once the deduplication task is overloaded, the metadata server 140 detects it and adds additional tasks.

Asynchronous deduplication may be performed by a separate job, which could take in a list of streams and rewrite fragments without duplicates.

Figure 5:
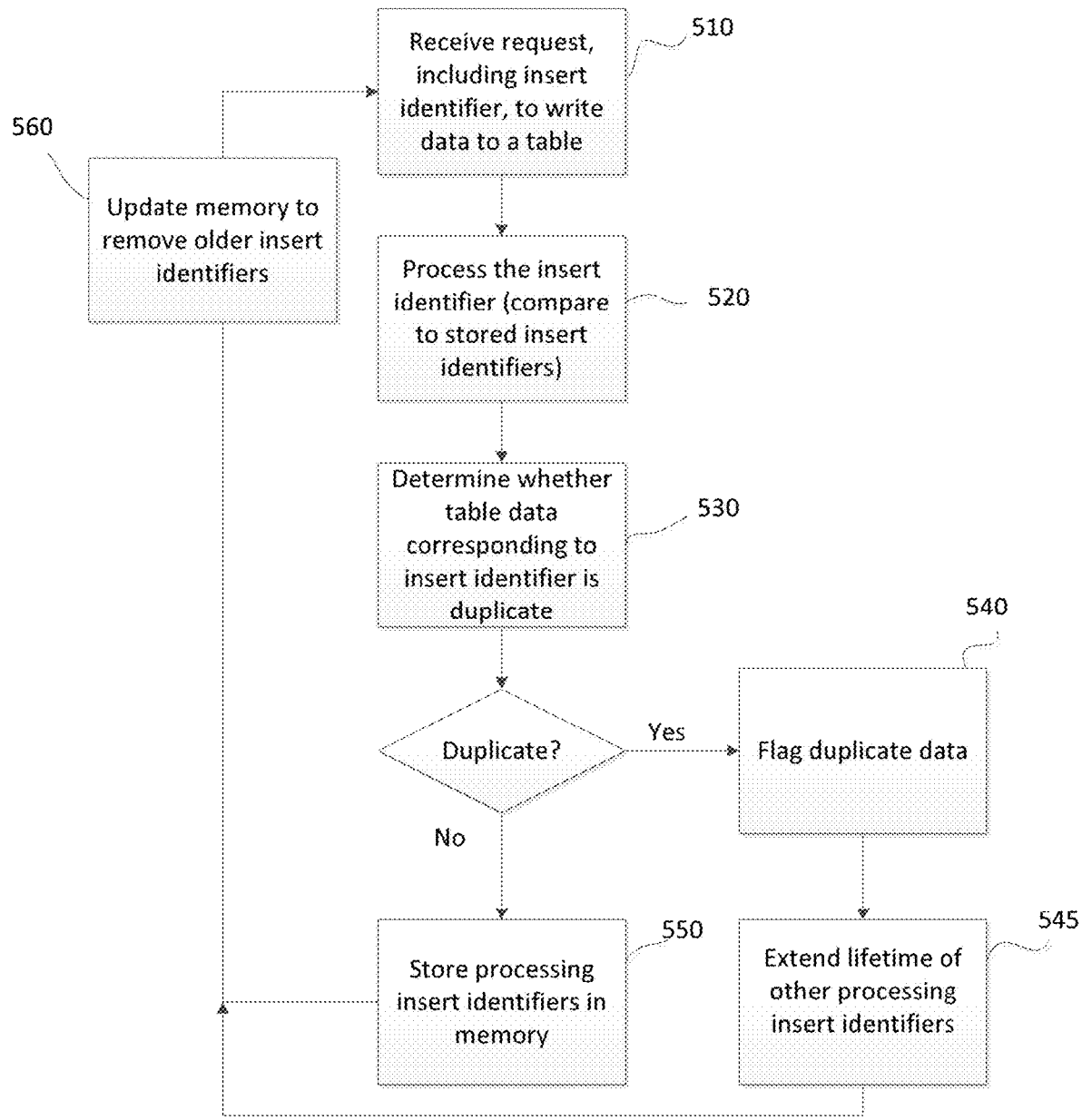
FIG. 5 is a flow diagram illustrating an example method according to aspects of the disclosure.

FIG. 5 illustrates an example method 500 of deduplication. The method may be performed by a deduplication service as described above. While operations of the method 500 are described in a particular order, it should be understood that in some instances the order may be modified or operations may be performed simultaneously. Moreover, operations may be added or omitted.

In block 510, a request to write data to a table is received, the request including an insert identifier. The insert identifiers may serve as unique keys for the data in the table.

In block 520, the deduplication service processes the insert identifier. For example, the deduplication service compares the received insert identifier with other insert identifiers that have been stored within a predetermined window of time. The predetermined time window may be relative to a current time. For example, the time window may include X number of seconds or minutes preceding a current time.

In block 530, the deduplication service determines whether table data corresponding to the insert identifier is duplicate data. For example, if the insert identifier being processed already exists in memory, it may be determined that the corresponding table data is duplicate.

If duplicate data is found, the duplicate data may be flagged in block 540. Flagging the duplicate data may include adding an identifier to the table or to another component, such as the stream server's log file, wherein the identifier indicates that data is duplicate and should not be read. In some examples, the data received with the request is not added to the table. For example, the system may skip adding the duplicate data to the table. In other examples, if duplicate data has already been written to the table, the duplicate data can be removed from the table. For example, the deduplication service can flag the duplicate data to indicate to another service to wipe the entire row of data from the table.

In block 545, when the received request is determined to include duplicate data based on the insert identifier, a lifetime of other insert identifiers being processed can be extended.

In block 550, when the received data is determined not to be duplicate, the processing insert identifier is stored in memory. In this regard, the processing insert identifier can be used for comparison to subsequent requests to determine whether such subsequent requests include duplicate data. When stored, the insert identifiers may be stored in a simple data architecture.

Regardless of whether duplicate data is found, the memory may be updated in block 560 to remove older insert identifiers. For example, any insert identifiers that were added to the table outside of the predetermined time window may be automatically evicted from memory. An eviction process may include, for example, comparing a timestamp associated with a given insert identifier with a current time, and evicting the insert identifier if the difference between the timestamp and the current time is greater than the amount of time in the predetermined time window. In this regard, new insert identifiers may continually be added, without overloading the memory.

The system and method for deduplication using a moving time window described above is advantageous in that the cost of running the deduplication service is reduced as compared to previous systems. Moreover, the real-time nature of the moving window approach allows for storing deduplication information alongside the data and accessing it immediately on read. In this regard, read after write consistency is supported.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for deduplication, comprising:
receiving, with one or more processors, a first request to write data, the first request including a first insert identifier uniquely identifying the data for determining whether the data is duplicate data;
comparing, with the one or more processors, the first insert identifier with other insert identifiers that have been stored in a table within a time window of predetermined duration moving relative to a current time, the other insert identifiers being stored in the table based on a timestamp associated with each of the other insert identifiers;
determining, with the one or more processors, that the data corresponding to the first insert identifier is not duplicate data based on the first insert identifier not being equivalent to any of the other insert identifiers;
storing, with the one or more processors, the first insert identifier with a timestamp in the table in response to determining that the data corresponding to the first insert identifier is not duplicate data; and
updating, with the one or more processors, the table to remove one or more insert identifiers of the other insert identifiers added before the time window of predetermined duration based on the timestamp associated with each of the other insert identifiers.

2. The method of claim 1, further comprising writing, by the one or more processors, the data in the first request.

3. The method of claim 1, further comprising:
receiving, with one or more processors, a second request to write data, the second request including a second insert identifier uniquely identifying the data;
determining, with the one or more processors, that the data corresponding to the second insert identifier is duplicate data based on comparing the second insert identifier with the other insert identifiers that have been stored in the table; and
extending, with the one or more processors, an amount of time that one or more of the other insert identifiers are stored in the table.

4. The method of claim 3, further comprising flagging, with the one or more processors, the duplicate data.

5. The method of claim 3, further comprising not writing the data in the second request.

6. The method of claim 3, wherein determining that the data corresponding to the second insert identifier is duplicate comprises determining that the second insert identifier is equivalent to one of the other insert identifiers.

7. A system comprising:
one or more processors; and
one or more storage devices coupled to the one or more processors and storing instructions that, when executed by the one or more processors, cause the one or more processors to perform operations for deduplication, the operations comprising:

receiving a first request to write data, the first request including a first insert identifier uniquely identifying the data for determining whether the data is duplicate data;

comparing the first insert identifier with other insert identifiers that have been stored in a table within a time window of predetermined duration moving relative to a current time, the other insert identifiers being stored in the table based on a timestamp associated with each of the other insert identifiers;

determining that the data corresponding to the first insert identifier is not duplicate data based on the first insert identifier not being equivalent to any of the other insert identifiers;

storing the first insert identifier with a timestamp in the table in response to determining that the data corresponding to the first insert identifier is not duplicate data; and updating the table to remove one or more insert identifiers of the other insert identifiers added before the time window of predetermined duration based on the timestamp associated with each of the other insert identifiers.

8. The system of claim 7, wherein the operations further comprise writing the data in the first request.

9. The system of claim 7, wherein the operations further comprise:

receiving a second request to write data, the second request including a second insert identifier uniquely identifying the data;

determining that the data corresponding to the second insert identifier is duplicate data based on comparing the second insert identifier with the other insert identifiers that have been stored in the table; and extending an amount of time that one or more of the other insert identifiers are stored in the table.

10. The system of claim 9, wherein the operations further comprise flagging the duplicate data.

11. The system of claim 9, wherein the operations further comprise not writing the data in the second request.

12. The system of claim 9, wherein determining that the data corresponding to the second insert identifier is duplicate comprises determining that the second insert identifier is equivalent to one of the other insert identifiers.

13. A non-transitory computer readable medium for storing instructions that, when executed by one or more processors, cause the one or more processors to perform operations for deduplication, the operations comprising:

receiving a first request to write data, the first request including a first insert identifier uniquely identifying the data for determining whether the data is duplicate data;

comparing the first insert identifier with other insert identifiers that have been stored in a table within a time window of predetermined duration moving relative to a current time, the other insert identifiers being stored in the table based on a timestamp associated with each of the other insert identifiers;

determining that the data corresponding to the first insert identifier is not duplicate data based on the first insert identifier not being equivalent to any of the other insert identifiers;

storing the first insert identifier with a timestamp in the table in response to determining that the data corresponding to the first insert identifier is not duplicate data; and updating the table to remove one or more insert identifiers of the other insert identifiers added before the time window of predetermined duration based on the timestamp associated with each of the other insert identifiers.

14. The non-transitory computer readable medium of claim 13, wherein the operations further comprise writing the data in the first request.

15. The non-transitory computer readable medium of claim 13, wherein the operations further comprise:

receiving a second request to write data, the second request including a second insert identifier uniquely identifying the data;

determining that the data corresponding to the second insert identifier is duplicate data based on comparing the second insert identifier with the other insert identifiers that have been stored in the table; and extending an amount of time that one or more of the other insert identifiers are stored in the table.

16. The non-transitory computer readable medium of claim 15, wherein the operations further comprise flagging the duplicate data.

17. The non-transitory computer readable medium of claim 15, wherein the operations further comprise not writing the data in the second request.

* * * * *